June 8, 1943.         N. W. MORSE         2,321,411
COFFEE BREWER
Filed Sept. 3, 1940
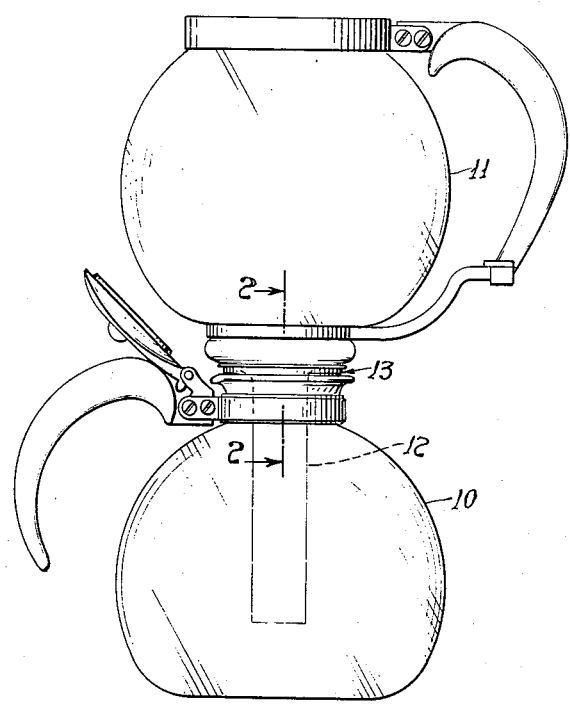
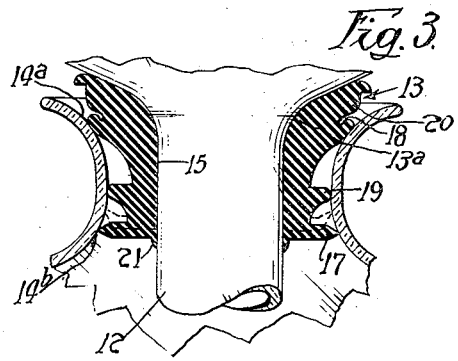
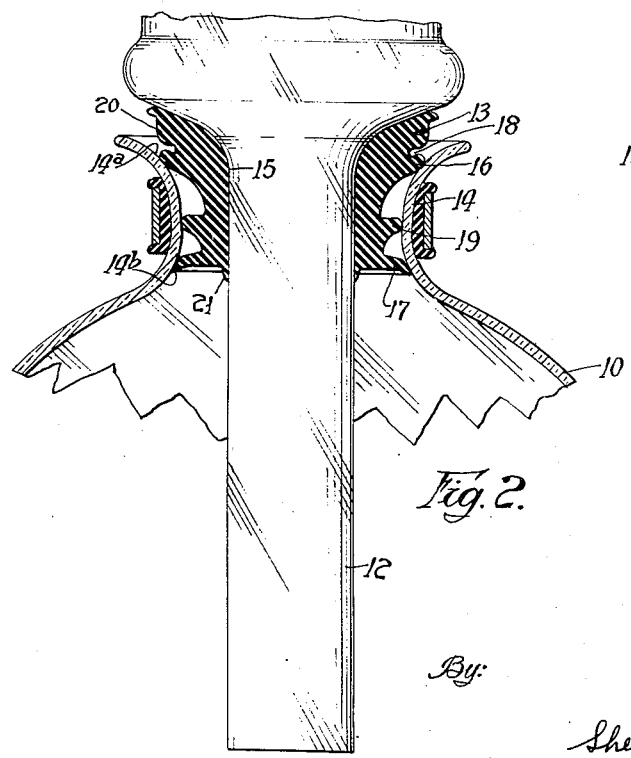
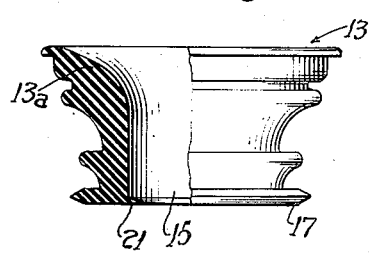
Inventor:
NORMAND W. MORSE
By: Sheridan Davis and Cargill
Attorneys.

Patented June 8, 1943

2,321,411

UNITED STATES PATENT OFFICE 2,321,411

COFFEE BREWER

Normand W. Morse, Chicago, Ill., assignor to Hill-Shaw Company, Chicago, Ill., a corporation of Illinois Application September 3, 1940, Serial No. 355,161

2 Claims. (Cl. 53—3)

This invention relates to improvements in coffee brewers.

One object of the invention is to provide an improved bushing for the stem of an upper bowl of a vacuum type brewer which not only facilitates the assembly of the upper and lower bowls in and separation of the bowls from operative relation but which provides a proper seal between the associated parts during the brewing operation.

Another object of the invention is to provide a bushing of the type mentioned which is provided with an upper and a lower flange which cooperate with respective curved portions of the neck of the lower bowl for sealing purposes during brewing operations, the lower flange effecting a seal, particularly during the periods when pressure conditions obtain in the lower bowl, while the upper flange effects the seal during that portion of the brewing cycle when vacuum conditions prevail in the lower bowl.

Another object of the invention is to provide bushings which provide seals between the stems or funnels of the upper bowls and the necks of the lower bowls and which, notwithstanding slight variations in the internal diameters of such necks, enables the upper bowls to be seated down a fixed distance into uniformly stable relation with respect to the lower bowls.

Other objects of the invention relate to various features of construction and arrangement of parts which will be apparent from a consideration of the following specification and accompanying drawing illustrating an embodiment of the invention.

Figure 1 is an elevation of a glass coffee brewer embodying the present improvements;

Figure 2 is an enlarged vertical sectional view through the upper portion of a lower bowl and through the improved bushing and showing the latter and an upper bowl in position in the neck of the lower bowl;

Figure 3 is a similar sectional view showing the position of the sealing flanges of the bushing just prior to their assuming normal sealing relation with respective portions of the neck of the lower bowl; and Figure 4 is an elevation partly in section of an improved bushing shown in detached relation.

In Figure 1 of the drawing a glass coffee brewer is illustrated comprising a lower bowl 10 and an upper bowl 11 which has a funnel or stem 12 which depends into the lower bowl during brewing operations. A bushing indicated generally by the numeral 13 is provided on an upper portion of the stem 12 to provide an air-tight seal between the stem and the neck portion 14 of the lower bowl. As illustrated in Figure 2, the neck is curved in vertical section, thus providing a flaring upper portion 14$^a$ and a flaring or curved lower portion 14$^b$. The bushing 13 is preferably of rubber provided with an axial opening 15 therefor for receiving the stem 12 of the upper bowl. The upper surface of the wall of the opening 15, as shown in Figures 2 to 4, is flared to correspond with the shape of the lower portion of the upper bowl with which the bushing contacts, as illustrated in Figure 2. The bushing 13 is provided on its periphery with an upper annular sealing flange 16 and a lower annular sealing flange 15.

Considerable difficulty has been encountered heretofore in providing bushings that will seat downwardly in the necks of the lower bowls a uniform distance and which will provide adequate sealing contact with the surfaces of the necks of the lower bowls. The flanges 16 and 17 are spaced apart vertically whereby, when the bushing is in the operative position shown in Figure 2, the upper flange 16 will contact the upper curved portion 14$^a$ of a neck above the portion thereof of smallest diameter while the flange 17 will contact the lower curved portion 14$^b$ of the neck below the said portion of minimum diameter. When the upper bowl is being placed on the lower bowl preparatory to brewing coffee or the like, the lower flange 17 will flex upwardly as it passes through the intermediate portions of the neck which are of smaller diameter than the diameter of the flange. It will be noted that the periphery of the flange 17 is tapered or feathered, and due to the flexibility of the rubber material of which the bushing is made the flange 17 flexes upwardly quite readily to accommodate the downward movement of the bushing to the position shown in Figure 3, which position is slightly lower with reference to the neck of the lower bowl than the position shown in Figure 2. Thus in seating the upper bowl in a lower bowl, downward pressure is exerted on the upper bowl sufficient to cause the upper flange 16 to be flexed upwardly into the superjacent annular channel 18. Such deflection of the upper flange 17 enables the bushing to be moved downwardly sufficiently into the neck to a position wherein the flange 17 is free from the wall of the neck and is enabled, by its inherent resiliency, to straighten out from the dotted line position shown in Figure 3 to the full line position. Upon release of the downward pressure, the upper flange 16, due to its resiliency, tends to return to normal position and thereby elevates the upper bowl slightly with reference to the neck of the lower bowl whereupon the feathered or tapered edge of the flange 17 is brought into contact with the lower curved portion 14$^b$ of the neck of the lower bowl or to the position illustrated in Figure 2. The force exerted by the flange 16, due to its shape and the amount of rubber of which it is composed, not only elevates the upper bowl and moves the edge of the flange into contact with the curved wall 14$^b$, but it places the lower flange under slight tension as the latter engages the wall 14$^a$, thus affording a proper seal during the pressure stage of the brewing operation. It will thus be seen that when the flanges 16 and 17 are in sealing relation they make contact with the respective upper and lower opposite flaring sections of the neck at portions thereof having internal diameters less than the normal diameters of the respective flanges. The peripheries of the flanges therefore are bent slightly from their normal planes, that is, the periphery of the upper flange 16 is deflected slightly upwardly while the periphery of the lower flange 17 is turned slightly downwardly and each is thus under slight tension.

While the internal diameters of the necks of lower bowls of the same model of coffee brewer may vary slightly, due to the lack of uniformity in the quantity of glass gathered by the glass blower in forming the bowl, such variations are not great but with bushings of the types previously employed such variations have resulted in inability to seat upper bowls down into the necks of lower bowls a uniform distance. With the present improvements, the upper bowls can be seated in lower bowls, notwithstanding variations in internal diameters of the necks, with substantial uniformity since, if the internal diameter of the neck of the lower bowl shown in Figures 2 and 3, for example, were slightly less than that shown, slightly more downward pressure could be exerted on the upper bowl in seating the latter in the lower bowl to further depress or deflect the upper flange 16 upwardly to free the lower flange 17 from contact with the wall of the neck and thus cause the bushing to assume substantially the same position vertically in the neck as the position shown in Figure 2 of the drawing. Where the neck is of smaller diameter than that shown, the lower flange 17 will be deflected upwardly at a slightly greater angle as the bushing is being moved toward seating position but, as stated, the flange 17 is quite flexible and insofar as the force required in positioning the bowls in proper relation is concerned, slight variations in internal diameters of the necks are of no consequence where the present bushing is employed. As stated, due to the resiliency of the upper flange 16, the upper bowl is elevated slightly when the downward pressure on the bowl is released and the lower flange 17 is moved from the full line position shown in Figure 3 to the sealing position shown in Figure 2 wherein, it will be seen, the flange 17 at its periphery is flexed downwardly slightly, while flange 16 is also retained under slight tension due to the weight of the upper bowl. This weight is increased as the water rises into the upper bowl and hence at the stage of the brewing operation when the upper flange is relied on primarily for providing the seal, the pressure of the flange adjacent the neck is at the maximum.

When pressure develops in the lower bowl during the initial portion of the brewing operation, the lower flange 17 is pressed more tightly into contact with the wall portion 14$^b$ of the neck and thus resists leakage of air, steam or vapor between the bushing and the neck. The greater the pressure in the bowl the greater is the sealing contact by reason of the arrangement just described. After the water in the lower bowl has risen to the upper bowl and the heat beneath the lower bowl is extinguished for the purpose of effecting the return of the brew in the upper bowl to the lower bowl, by reason of the partial vacuum which obtains in the lower bowl at this stage of the brewing operation the flange 16 is in such relation to the wall of the neck as effectively to prevent entrance of air between the bushing and the neck. The greater the vacuum in the bowl, the greater will be the tendency of the air on the outside to press the flange 16 into sealing contact with the curved portion 14$^a$ of the neck. Thus during that portion of a brewing operation in which pressure obtains in the lower bowl, the flange 17 primarily effects a seal between the bushing and the neck, while during the vacuum stage of the brewing operation the flange 16 primarily provides the seal between the members mentioned. Both flanges, of course, effect some sealing action during both the brewing stages although, as mentioned, the pressure in the lower bowl augments the sealing action of the lower flange while the pressure differential during the vacuum portion of the brewing cycle augments the sealing action of the flange 16.

An intermediate flange 19 is shown which is not primarily for sealing purposes but which is of advantage in steadying or stabilizing the upper bowl with reference to the lower bowl when the bowls are in operative position. The diameter of the flange 19 may correspond with the average internal diameter of the necks of the bowls and hence where a bowl is of greater than average diameter the periphery of the flange will have no sealing action, although it will tend to inhibit relative rocking or tilting movement of the upper bowl with reference to the lower bowl. Where the internal diameter of the neck is below average, the flange 19 may be flexed upwardly slightly due to contact with the wall of the neck but it will assist in stabilizing the upper bowl against tilting with respect to the lower bowl.

It will be noted that in the use of the present improvements, the sealing action is attained by the cooperation of the upper and lower flanges contacting annular curved portions of the bowl neck above and below the portion of the neck of minimum diameter. Radial compression of the rubber of which the bushing is formed is thus not relied on in effecting a seal as with many bushings heretofore used, and there is thus no tendency for the improved bushing to creep upwardly from the flaring neck of the lower bowl and break the seal between the bowls during brewing operations.

Spaced above the flange 17 is a shoulder 20 with which the flange may contact if the upper bowl is pressed downwardly into the lower bowl with excessive pressure and it thus limits the downward movement of the bushing into the neck.

As shown in Figure 4, the bushing is provided with an inwardly directed flange 21 at its lower end which engages the funnel 12 of the upper bowl and provides an air-tight seal therewith. The flange 21 is distended when moved upwardly on the stem to normal position and causes the bushing to cling to the stem so firmly that no slippage of the bushing on the stem occurs during the separation of the bowls following a brewing operation.

In removing an upper bowl equipped with the improved bushing, a slight tilting or rocking action of the upper bowl only is required to free the bowls since there is little or no cohesive action between the bushing parts and the neck of the lower bowl and, due to the flexibility of the lower flange 17, separation of the bowls is thus readily accomplished.

Grease or the like on the improved bushing does not impair its sealing action as in certain former types of bushings. Moisture on the flange 17 of the bushing actually facilitates the insertion of the bushing into the neck of the lower bowl as well as its removal therefrom since the moisture acts as a lubricant between the rubber and the glass, whereas with prior bushings the presence of moisture on the rubber or the contacting portions of the glass frequently contributed to the unseating of the bushings during brewing operations or rendered the proper initial seating of the bushings and adhesion of the same to the glass quite difficult.

While I have shown and described an embodiment of my improvement for the purpose of illustration, it will be apparent that various modifications may be made therein without departing from the spirit of the invention.

I claim:

1. A bushing for use on a funnel of a coffee brewer comprising an upper bowl having a funnel and a lower bowl provided with a neck having upper and lower flaring sections adjacent an intermediate portion of minimum diameter, said bushing being provided with upper and lower flexible sealing flanges, the lower flange being of a diameter greater than the minimum diameter of said neck and being deflectable from normal position in passing through said intermediate portion into the lower flaring section of the neck, said upper flange being of greater diameter than the minimum diameter of the neck and being deflectable from normal position by manually imparted downward movement of the bushing after said upper flange is in contact with the upper flaring section of the neck whereby the lower flange is released from contact with the lower flaring section sufficiently to enable the same to return to normal position by the force of its resiliency, said upper deflected flange exerting an upward thrust against the upper flaring section of the neck with which it contacts when the downward manually exerted force on the upper bowl has been terminated which elevates the upper bowl and the bushing a distance sufficient to cause the periphery of the lower flange to engage the lower flaring portion of the neck and deflect the lower flange in a direction opposite the direction of deflection of the upper flange.

2. A bushing for a funnel of an upper bowl of a coffee brewer having a lower bowl provided with a neck having flaring portions above and below a portion of minimum diameter comprising a body having a passage therethrough for snugly receiving the said funnel and adapted to be positioned within said neck, said body having a pair of peripheral horizontal flexible sealing flanges so spaced apart vertically and of such diameter that upon passing said upper bowl with the bushing thereon downwardly into operative position on the lower bowl said upper flange contacts at its periphery an annular portion of the upper flaring portion of the neck and is deflected upwardly from its normal horizontal position and said lower flange is passed downwardly through the portion of the neck of minimum diameter and into the space of the lower flaring portion of the neck to a position wherein said lower flange is out of contact with said neck wall and assumes its normal horizontal position, the elasticity of said upper flange being sufficient to elevate the upper bowl when said downward pressure thereon is released and thereby move said lower flange into peripheral sealing contact with the lower flaring portion of the neck.

NORMAND W. MORSE.